United States Patent [19]

Celek

[11] 3,893,172

[45] July 1, 1975

[54] AUTOMATIC MASTER CLOCK TRACK WRITER

[75] Inventor: John Edward Celek, Carol Stream, Ill.

[73] Assignee: GTE Automatic Electric Laboratories Incorporated, Northlake, Ill.

[22] Filed: Sept. 9, 1974

[21] Appl. No.: 504,586

[52] U.S. Cl. .................................................. 360/51

[51] Int. Cl. .................................................. G11b 5/09

[58] Field of Search ................................ 360/39, 51

[56] References Cited

UNITED STATES PATENTS

| | | | |
|---|---|---|---|
| 3,531,787 | 9/1970 | Fuller | 360/51 |
| 3,668,665 | 6/1972 | Reynolds | 360/51 |

*Primary Examiner*—Vincent P. Canney

[57] ABSTRACT

A drum memory system of the type which includes a revolving magnetic drum adapted for the storage of data thereon has an automatic master clock track writer which assures that the drum index pulses stored on the drum for a single drum revolution are of a predetermined number and in a closed loop about the drum. The automatic master clock track writer or control circuit includes a pulse coincidence sensor for sensing when the last of the drum index pulses is coincident with a master reset pulse which marks the end of each drum revolution to detect when the drum index pulses are of the predetermined number and arranged on the drum in a closed loop. The control circuit additionally includes a function control means which sequentially causes the memory system erasing means, writing means and reading means to be enabled until the pulse coincidence sensor inhibits the erasing and writing means.

12 Claims, 3 Drawing Figures

AUTOMATIC MASTER CLOCK TRACK WRITER

BACKGROUND OF THE INVENTION

The present invention is directed to a drum memory system and more particularly to an automatic master clock track writer or control circuit for use in such a system.

As well known, drum memory systems find particular application to the storage of data. To facilitate addressing of such data, the magnetic revolving drums of such systems are provided with two clock tracks, a master reset pulse (MRP) track and a drum index pulse (DIP) track. The MRP track consists of one pulse for each drum revolution to thereby indicate when one drum revolution has been completed and the next begun. The DIP track consists of a predetermined number of pulses written around the drum for a single revolution which are ultimately used for addressing data stored on the drum.

To have a properly written master track, the last index pulse must be under the reset pulse or in other words, coincident with the reset pulse. An underwritten track has a gap between the first and last index pulses and an overwritten track as an overlap in the index pulses. Obviously, neither the overwritten nor the underwritten DIP track condition is acceptable. Therefore, it is the aim when writing the master tracks onto the drum to provide the drum with a DIP track for a single revolution wherein the drum index pulses are of a predetermined number and are spaced on the drum to form a closed loop about the drum for the single revolution.

The prior art method of providing a magnetic revolving drum with a properly written master track involved manual operations. The drum heretofore has been manually erased and written with the MRP and DIP tracks and then manually observed on an oscilloscope to determine if the last index pulse coincides with the reset pulse. If the DIP track is underwritten, the DIP period is manually adjusted and then the procedure repeated. Because thousands of index pulses may be required, the above procedure can be rather cumbersome and take an exceedingly long time to successfully complete.

It is therefore an object of the present invention to provide a control circuit for a drum memory system which automatically provides a properly written master track.

It is another object of the present invention to provide a control circuit for a drum memory system which sequentially causes erasing, writing and reading of the master track while continuously increasing the drum index pulse period until a properly written master track is obtained.

It is a still further object of the present invention to provide a control circuit for a drum memory system which inhibits further erasing and writing of the master tracks after a properly written master track is obtained.

The present invention provides in a drum memory system of the type which includes a revolving magnetic drum, a writing means including an index pulse source for providing the drum with index pulses until receipt of a count signal to afford ready access to data stored on the drum and a master reset pulse source for providing the drum with a reset pulse upon the completion of each drum revolution, reading means comprising an index pulse sensor for reading the index pulses on the drum and a reset pulse sensor for reading the reset pulses on the drum, an index pulse counter for counting the number of index pulses written onto and read from the drum and for providing a count signal when a predetermined number of index pulses have been counted, and an erasing means for erasing the index and reset pulses from the drum, a control circuit for insuring that the predetermined number of index pulses are stored on the drum in a closed loop for a single drum revolution. The control circuit comprises a first pulse coincidence sensing means coupled to the index pulse sensor and to the master reset pulse sensor for sensing the coincidence of an index pulse and a reset pulse and for providing a first control signal in response to such coincidence. The control circuit of the present invention additionally comprises a second pulse coincidence sensing means coupled to the first pulse coincidence sensing means and to the counter for providing a second control signal responsive to the coincidence of the first control signal and the count signal and a latching means coupled to the second pulse coincidence sensing means for inhibiting the erasing and writing means and for providing an indication in response to the second control signal. As a result, when a master reset pulse and an index pulse are coincident the first pulse coincident sensing means provides the first control signal and when the first control signal is coincident with the count signal the second pulse coincidence sensing means provides the second control signal to cause the latching means to inhibit further erasing and writing and to provide an indication that the drum has recorded thereon for one drum revolution the predetermined number of index pulses in a closed loop.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, and the several figures of which like reference numerals identify like elements, and in which:

DESCRIPTION OF THE PREFERRED EMBODIMENT

Figure 1:
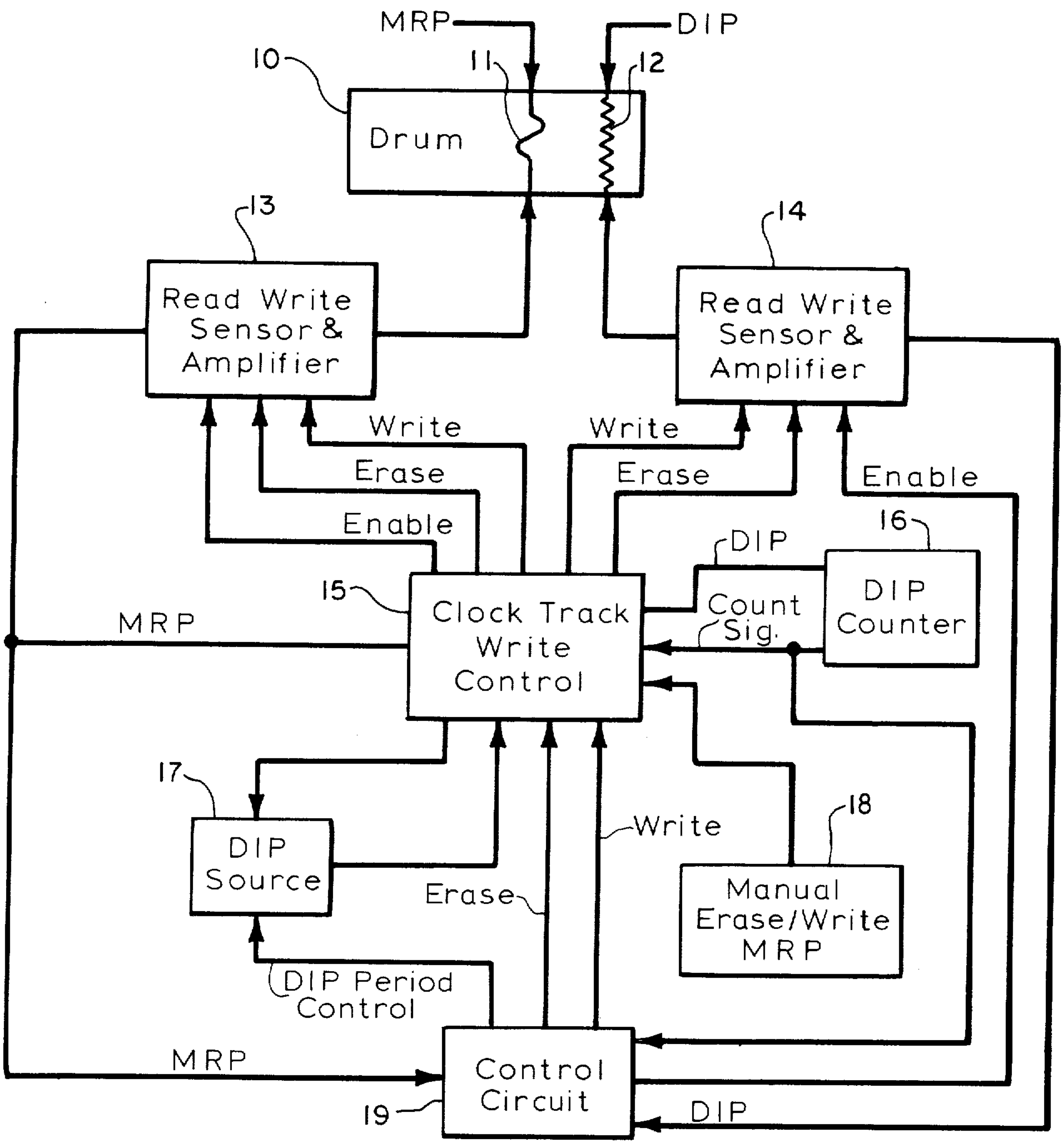
FIG. 1 is a block schematic representation of a drum memory system incorporating a control circuit embodying the present invention.

Referring now to FIG. 1, the drum memory system thereshown comprises revolving magnetic drum 10, MRP read-write sensor and amplifier 13, DIP read-write sensor and amplifier 14, clock track write control 15, DIP counter 16, DIP source 17, manual erase-write MRP control 18, and control circuit 19 embodying the present invention.

Revolving magnetic drum 10 includes MRP track 11 and DIP track 12. MRP track 11 is magnetically coupled to the read-write sensor and amplifier 13 so that the MRP track can be written onto the drum and additionally read off the drum. The read-write sensor and amplifier 13 receives write, erase and enable inputs from the clock track write control 15.

The DIP read-write sensor and amplifier 14 is also magnetically coupled to DIP track 12 for sensing and writing the DIP track onto the drum. It also receives write and erase signals from the clock track write control 15. Also coupled to the clock track write control 15 is DIP counter 16 for counting the number of drum index pulses written onto and read from the drum. It provides a count signal when a predetermined number of pulses have been stored onto the DIP track to cause the clock track write control 15 to inhibit further writing of pulses onto the DIP track. The count signal is also impressed upon the control circuit 19 of the present invention. Manual erase-write MRP 18 is provided for manually erasing and writing the MRP track. DIP source 17 which is preferably a multivibrator oscillator is coupled to the clock track write control 15 and provides the index pulses to be written onto the drum. Control circuit 19 includes a DIP period control which continuously increases the period of the drum index pulses. The control circuit 19 receives master reset pulses read off of the drum from the read-write sensor and amplifier 13 and drum index pulses read off of the drum by the DIP read-write sensor and amplifier 14.

When a master track is to be written onto the drum 10, the control circuit 19 provides the clock track write control 15 with an erase enabling input to enable the read-write sensing amplifiers 13 and 14 to erase the previous MRP and DIP tracks respectively. After the MRP and DIP tracks are erased, the control circuit then enables through the clock track write control 15 the read-write sensor amplifier 13 and read-write sensor amplifier 14 to initiate the writing of the MRP and DIP tracks. Additionally, at the initiation of the writing of the tracks, the control circuit provides the DIP source 17 with a period control signal to cause the DIP track to be initially underwritten. The DIP period control signal from the control circuit 19 continuously causes the DIP period to be increased. The MRP and DIP tracks are written until the DIP counter 16 counts up to the predetermined number of pulses whereupon the count signal developed by the DIP counter causes the clock track write control circuit 15 to terminate further writing of the MRP and DIP tracks.

After the MRP and DIP tracks are written, the control circuit then enables the read-write sensor amplifiers 13 and 14 to read the MRP and DIP tracks. If the last drum index pulse does not coincide with the master reset pulse, the control circuit automatically initiates the same procedure and sequentially enables the erasing means, the writing means, and the reading means until a properly written master track is obtained.

Figure 2:
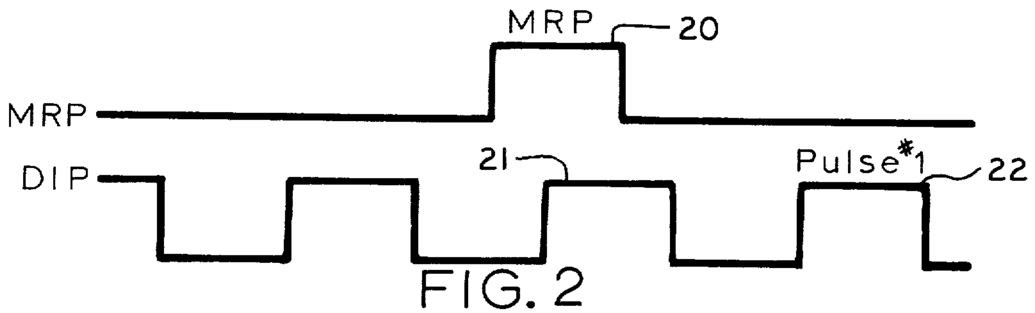
FIG. 2 shows waveforms representing a master reset pulse in relation to the drum index pulses for a properly written master track.

The properly written master track as previously described includes a DIP track having a predetermined number (e.g. 10,999) of pulses stored on the drum for one revolution and wherein the index pulses comprise a closed loop for the single drum revolution. The relationship of the master reset pulse and the last drum index pulse for a properly written track is shown in FIG. 2. MRP 20 as shown in coincident with the last drum index pulse 21 indicating that the predetermined number of index pulses are on the DIP track. Also to be noted from FIG. 2 is the fact that the last drum index pulse 21 is not spaced apart from the first drum index pulse 22 by more than half of a drum index pulse period. Therefore, as can be clearly seen in FIG. 2, the drum index pulses form a closed loop about the drum for the single revolution of the drum.

Figure 3:
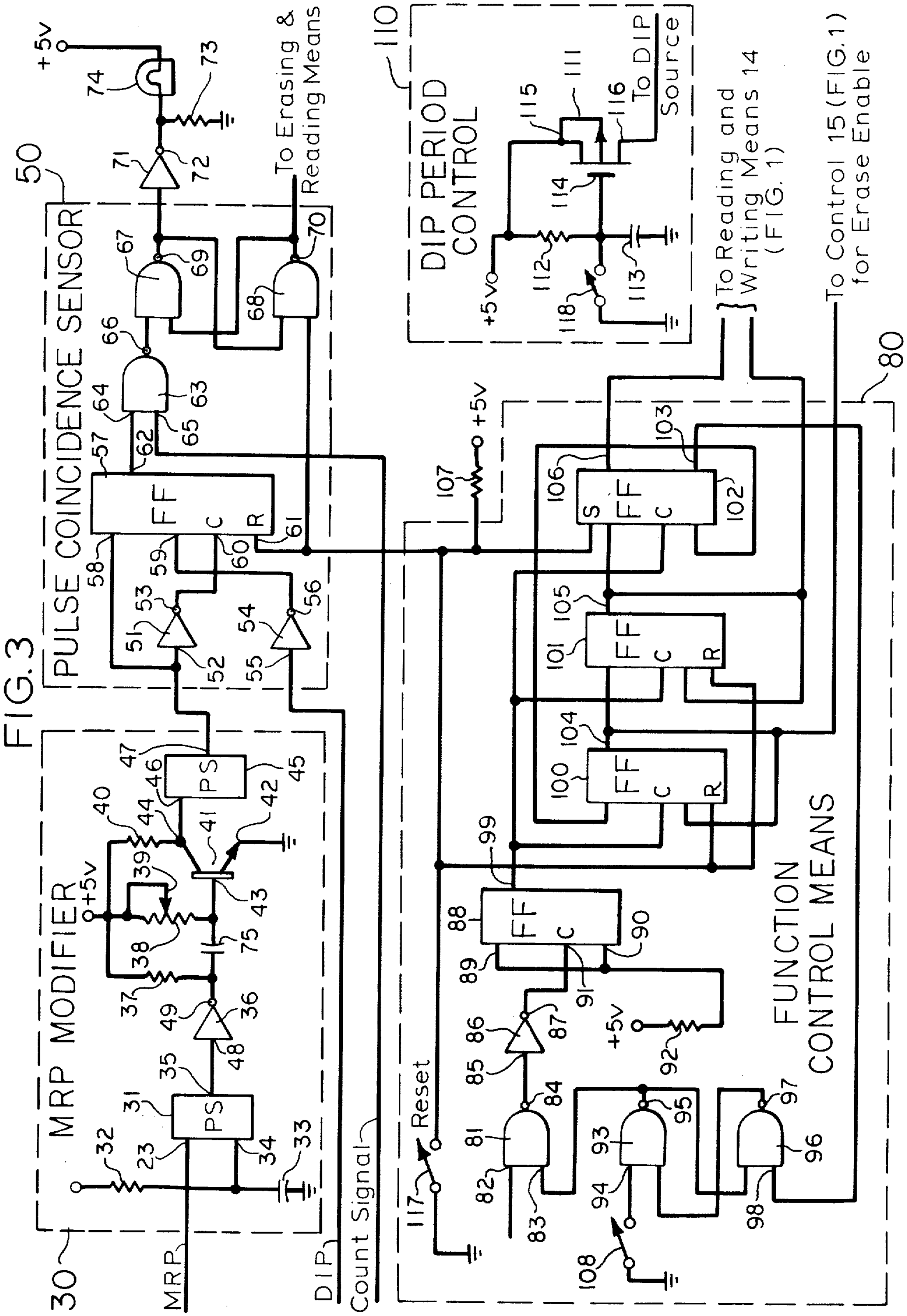
FIG. 3 is a detailed schematic circuit diagram of a control circuit embodying the present invention.

Referring now to FIG. 3 and the detailed schematic circuit diagram of a control circuit embodying the present invention, the control circuit comprises master reset pulse modifier 30, pulse coincidence sensor 50, function control means 80, and drum index pulse period control means 110.

MRP modifier 30 comprises pulse shaper 31, inverter 36, transistor 41 and pulse shaper 45. Pulse shaper 31 has an input 23 coupled to the read-write sensor and amplifier 13 (FIG. 1) for receiving master reset pulses read off of the drum. Input 34 is coupled to a first delay network comprising resistor 32 which is coupled to a +5 volt power source, and capacitor 33 which is grounded. Output 35 of pulse shaper 31 is coupled to input 48 of inverter 36. Output 49 of inverter 36 is coupled to resistor 37 which is coupled to a +5 volt power source. Capacitor 75 and resistor 38 form a second delay network and are coupled to base 43 of transistor 41. Resistor 38 is also coupled to the +5 volt power source. Resistor 38 has wiper 39 for varying the effective resistance between base 43 and the power source. Collector 44 of transistor 41 is coupled to the +5 volt power source by resistor 40 and is also coupled to input 46 of pulse shaper 45.

MRP modifier operates to shorten the pulse duration of the master reset pulses it receives. The pulse shaper 31 in conjunction with the resistor 32 and capacitor 33 delays the leading edge of the master reset pulses by an amount dependent upon the values of resistor 32 and capcitor 33. The delayed leading edge of the master reset pulse is inverted by inverter 36 and upon its occurence turns off transistor 41. Transistor 41 in conjunction with resistor 37, 38 and 40 and capcitor 75 forms a clamping circuit which terminates the modified master reset pulse after a time duration dependent upon the effective resistance of resistor 38 as determined by the position of wiper 39. The modified MRP is fed into pulse shaper 45 so that a well-defined pulse is obtained.

The amount in which the master reset pulse is shortened is determined by the resistance of resistor 38 and is dependent upon the timing tolerances of the drum memory system. In those systems with large enough timing tolerances, the MRP modifier might not be necessary.

The pulse coincidence sensor 50 comprises a first pulse coincidence sensing means including inverters 51 and 54 and flip-flop 57 and a second pulse coincidence sensing means comprising NAND gate 63.

Input 52 of inverter 51 is coupled to output 47 of pulse shaper 45 and to input 58 of flip-flop 57. Output 53 of inverter 51 is coupled to input 60 of flip-flop 57 and input 55 of inverter 54 is coupled to the read-write sensor and amplifier 14 (FIG. 1) for receiving drum index pulses therefrom. Output 56 of inverter 54 is coupled to clock input 59 of flip-flop 57. Reset input 61 of flip-flop 57 is coupled to a +5 volt power source through resistor 107. Output 62 of flip-flop 57 is coupled to input 64 of the second pulse coincidence sensing means NAND gate 63. Input 65 of NAND gate 63 is coupled to DIP counter 16 (FIG. 1) for receiving the count signal developed by the DIP counter. Output 66 of NAND gate 63 is coupled to a latching circuit comprising NAND gate 67 and NAND gate 68. The latching circuit is of a well-known configuration and therefore will not be described in detail herein.

Output 69 of NAND gate 67 is coupled to inverter 71 which has an output 72 coupled to resistor 73 and lamp 74. Lamp 74 is coupled to a +5 volt power source and resistor 73 is coupled to ground.

The master reset pulse modifier and pulse coincidence sensor cooperate to sense when a properly written track on the drum has been obtained. When the master track on the drum is being read, the master reset pulse developed after the single revolution is delayed and shortened by the master reset pulse modifier 30 and impressed upon inverter 51. The master reset pulse is impressed upon input 58 of flip-flop 57 and an inverted version thereof is impressed upon input 60 of flip-flop 57. The drum index pulse upon clocking clocking flip-flop 57 in the presence of a master reset pulse providing a logical 1 on input 58 and a logical 0 on input 60, will cause flip-flop 57 to change state so that output 62 will attain the logical 1 level. The logical 1 level is a first control signal which signifies that a drum index pulse is coincident with the master reset pulse.

If such coincidence is obtained, a logical 1 will be impressed upon input 64 of second pulse coincidence sensing means NAND gate 63. If the drum index pulse which coincides with the master reset pulse is the last of the predetermined number of index pulses, the count signal generated by the DIP counter will develop a logical 1 on input 65 of NAND gate 63. The logical 1's on both inputs 64 and 65 of NAND gate 63 will cause output 66 to attain the logical 0 state or second control signal which will set the latch comprising NAND gate 67 and NAND gate 68. In so doing, a logical 1 will be developed at output 69 which is inverted by inverter 71 so that the low output of inverter 71 will cause lamp 74 to light indicating that the properly written track has been obtained. Also, the latching circuit will develop at output 70 of NAND gate 68 a logical 0 which is fed to the clock track write control 15 (FIG. 1) to inhibit the erasing and reading means of the drum memory system.

In addition to sensing when a properly written track is obtained, the control circuit of FIG. 3 additionally sequentially enables the erasing, writing and reading means of the system until the properly written track is obtained. The function control means 80 which sequentially enables the erasing, writing and reading means, comprises NAND gates 81, 93 and 96, inverter 86 and flip-flops 88, 100, 101 and 102. Input 82 of NAND gate 81 is coupled to the read-write sensor and amplifier 13 for receiving the master reset pulses therefrom. Input 83 is coupled to the latching circuit comprising NAND gates 93 and 96. Specifically, input 83 is coupled to output 95 of NAND gate 93. Output 84 of NAND gate 81 is coupled to input 85 of inverter 86 which has an output 87 coupled to clock input 91 of flip-flop 88. Inputs 89 and 90 of flip-flop 88 are coupled to a +5 volt power source. Output 99 of flip-flop 88 is coupled to the clock inputs of flip-flops 100, 101 and 102. These flip-flops are wired in a well-known ring counter configuration and therefore will not be described in detail. Output 103 of flip-flop 102 is coupled to input 98 of NAND gate 96. The latching circuit comprising NAND gates 93 and 96 operates in such a way that when switch 108 is open, the latching circuit will provide a logical 0 at input 83 of NAND gate 81 when the system is in the read mode to inhibit further ring counter operation.

The function control means operates as follows. With switch 108 closed enabling the operation of the ring counter, each master reset pulse received at input 82 will be transferred through inverter 86 to the clock input 91 of flip-flop 88. Because inputs 89 and 90 of flip-flop 88 are tied to a positive power source, upon each clock pulse being received, output 99 of flip-flop 88 will change state. This in effect decreases the frequency of the master reset pulses by a factor of two. The output pulses at output 99 of flip-flop 88 which result are used to clock each of the flip-flops 100, 101 and 102 of the ring counter. As well known, upon receipt of a clock pulse, a previous flip-flop in the ring counter chain will set the input of the next succeeding flip-flop. Therefore, because output 104 is coupled to the clock track write control 15 (FIG. 1) to enable the erasing means and because outputs 105 and 106 are coupled to reading and writing means 14, the function control means 80 of FIG. 3 will sequentially enable the erasing, writing and reading means of the system. Because the flip-flop 88 divides the frequency of the master reset pulses by a factor of two, each of the reading, writing and erasing operations will follow through two revolutions revoltuions of the drum. This is to insure that all of the master tracks are erased, and additionally to insure that all of the drum index pulses are put into the drum. However, it must be recognized that the DIP counter 16 of FIG. 1 inhibits further storing of drum index pulses on the drum after it has counted the predetermined number of drum index pulses.

The DIP period control circuit 110 of FIG. 3 comprises FET transistor 111, resistor 112 and capacitor 113. The gate 114 of FET 111 is coupled to the junction of resistor. 112 and capacitor 113. Resistor 112 is coupled to a +5 volt power source and capacitor 113 is coupled to ground. The gate 114 is also coupled to a switch 118 for selectively coupling gate 114 to ground. Source 115 of FET 111 is coupled to the +5 volt power source and drain 116 is coupled to the DIP source (FIG. 1).

As one skilled in the art can appreciate, when switch 118 is closed grounding gate 114, the time constant created by resistor 112 and capacitor 113 will cause a ramp voltage to be created at drain 116 of FET 111. This ramp voltage is coupled to the multivibrator oscillator of the DIP source 17 (FIG. 1) to continuously increase the drum index pulse periods.

When a master clock track is to be placed onto a drum, the DIP period control circuit 110 is initially reset to 0 by the closing of switch 118. This assures that when the writing begins, the writing of the drum index pulses will be in the underwritten condition. Additonally, switch 117 is closed to reset the circuit to its starting state. The first master reset pulse read from the drum will cause the erasing means to be enabled which then erases the drum for two revolutions. The third master reset pulse received by flip-flop 88 will cause flip-flop 101 to enable the writing means which then begins to write the drum index pulses onto the drum with the drum index pulse periods being continuously increased by the DIP period control circuit 110. After the predetermined number of drum index pulses are written onto the drum, the count signal from the DIP counter inhibits further writing and the drum proceeds to revolve until the end of its fourth revolution. At this point, the reading means is enabled and the drum index pulses are read off of the drum and counted by the DIP counter 16. If the track is not properly written, the criteria to satisfy the pulse coincidence sensor 15 will not be present and the ring counter will recycle the system operation. The system will recycle through the erasing, writing and reading operations until the criteria to satisfy the pulse coincidence sensor is obtained at which point the latching circuit comprising NAND gates 67 and 68 will inhibit the erasing and writing means and also illuminate light 74 to indicate that a properly written track has been obtained.

If during the procedure it is required to inhibit the ring counter, switch 108 may be opened which will cause the latching means comprising NAND gate 93 and NAND gate 96 to inhibit the ring counter when the system reaches the reading operation. Upon reaching the reading operation, flip-flop 102 at output 103 will be in the logical 0 state which sets the latch along with switch 104 being open such that a logical 0 will be impressed upon input 83 of NAND gate 81 from output 95 of NAND gate 93. The logical 0 at input 83 will cause output 84 of NAND gate 81 to be continuously in the logical 1 state so that flip-flop 88 will no longer be clocked.

The present invention therefore provides a control circuit for a drum memory system which assures that a properly written master clock track will be obtained on the system's revolving magnetic drum. The control circuit of the present invention includes a master reset pulse modifier which shortens the duration of the master reset pulses used by the control circuit to obtain whatever timing tolerances are required. Additionally, the control circuit of the present invention continuously and sequentially repeats the erasing, writing and reading sequence in response to first, second and third sets of reset pulses until a master track which is properly written is obtained. As a consequence, no manual manipulation is required, thus relieving an operator of the cumbersome requirements of obtaining a master track as well as saving considerable time in producing a master track.

While a particular embodiment of the invention has been shown and described, it will be obvious to those skilled in the art that changes and modifications may be made without departing from the invention in its broader aspects and therefore, the aim in the appended claims is to cover all such changes and modifications as fall within the true spirit and scope of the invention.

I claim:

1. In a drum memory system of the type which includes a revolving magnetic drum, a writing means including an index pulse source for providing the drum with index pulses until receipt of a count signal to afford ready access to data stored on the drum and a master reset pulse source for providing the drum with a reset pulse upon the completion of each drum revolution, reading means comprising an index pulse sensor for reading the index pulses on the drum and a reset pulse sensor for reading the reset pulses on the drum, an index pulse counter for counting the number of index pulses written onto and read from the drum and for providing the count signal when a predetermined number of index pulses have been counted, and an erasing means for erasing the index and reset pulses from the drum, the improvement of a control circuit for insuring that said predetermined number of index pulses are stored on the drum in a closed loop for a single drum revolution comprising:

a first pulse coincidence sensing means coupled to said index pulse sensor and to said master reset pulse sensor for sensing the coincidence of an index pulse and a reset pulse and for providing a first control signal in response to such coincidence;

a second pulse coincidence sensing means coupled to said first pulse coincidence sensing means and to said counter for providing a second control signal responsive to the coincidence of said first control signal and said count signal; and a latching means coupled to said second pulse coincidence sensing means for inhibiting said erasing and writing means and for providing an indication in response to said second control signal; whereby when a master reset pulse and an index pulse are coincident said first pulse coincidence sensing means provides said first control signal and when said first control signal is coincident with said count signal said second pulse coincidence sensing means provides said second control signal to cause said latching means to inhibit further erasing and writing and to provide an indication that the drum has recorded thereon for one drum revolution said predetermined number of index pulses in a closed loop.

2. A control circuit in accordance with claim 1 further comprising master reset pulse modifying means coupled between said reset pulse sensor and said first pulse coincidence sensing means for shortening the duration of the master reset pulses presented to said first pulse coincidence sensing means.

3. A control circuit in accordance with claim 2 wherein said master reset pulse modifying means comprises a first pulse shaper including a first delay network for delaying the leading edge of each reset pulse and a clamping circuit including a second delay network for terminating each said modified reset pulse after a predetermined time duration.

4. A control circuit in accordance with claim 2 wherein said first pulse coincidence sensing means comprises a flip-flop having a first input, a second input, a clock input, and an output, and an inverter having an input and an output, said first input being coupled to said master reset pulse modifying means, said second input being coupled to said inverter output, said inverter input also being coupled to said master reset pulse modifying means, said clock input being coupled to said index pulse sensor, and said flip-flop output being coupled to said second pulse coincidence sensing means.

5. A control circuit in accordance with claim 2 wherein said second pulse coincidence sensing means comprises a NAND gate having a pair of inputs, one input being coupled to said first pulse coincidence sensing means, the other input being coupled to said index pulse counter for receiving said count signal therefrom, and said output being coupled to said latching circuit.

6. A control circuit in accordance with claim 2 wherein said latching circuit comprises a pair of NAND gates.

7. A control circuit in accordance with claim 1 further comprising an index pulse period increasing means coupled to said index pulse source for continuously increasing the period of said index pulses.

8. A control circuit in accordance with claim 7 wherein said pulse period increasing means further comprises a reset means to cause said drum to be initially underwritten.

9. A control circuit in accordance with claim 7 further comprising a function control means coupled to said erasing means, said writing means and said reading means, and coupled to said master reset pulse sensor for sequentially enabling said erasing means, said writing means, and said reading means responsive to first, second and third successive sets of reset pulses respectively, whereby said drum is sequentially erased, written with reset pulses and index pulses of continuously increasing periods and read until said second control signal is provided by said second pulse coincidence sensing means whereupon said erasing and writing means are inhibited.

10. A control circuit in accordance with claim 9 wherein said function control means comprises a ring counter.

11. A control circuit in accordance with claim 10 further comprising a flip-flop coupled between said ring counter and said master reset pulse sensor for dividing the frequency of said master reset pulses received by said ring counter by a factor of two.

12. A control circuit in accordance with claim 10 further comprising a gate and a latching circuit, said gate being coupled between said ring counter and said master reset pulse sensor, and said latching circuit being coupled to said ring counter and to said gate, and being responsive to said function control circuit enabling only said reading means for inhibiting said ring counter only when said reading means is enabled.

* * * * *